US012624213B2

(12) United States Patent
Han et al.

(10) Patent No.: US 12,624,213 B2
(45) Date of Patent: May 12, 2026

(54) NATURAL COLORING AGENT COMPOSITION

(71) Applicant: CJ CHEILJEDANG CORPORATION, Seoul (KR)

(72) Inventors: Jin Hee Han, Seoul (KR); Sung Hoon Jo, Seoul (KR); Hyo Jung Yoon, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 309 days.

(21) Appl. No.: 18/265,058

(22) PCT Filed: Dec. 3, 2021

(86) PCT No.: PCT/KR2021/018241
§ 371 (c)(1),
(2) Date: Jun. 2, 2023

(87) PCT Pub. No.: WO2022/119385
PCT Pub. Date: Jun. 9, 2022

(65) Prior Publication Data
US 2023/0407097 A1 Dec. 21, 2023

(30) Foreign Application Priority Data

Dec. 4, 2020 (KR) ........................ 10-2020-0168854
Dec. 4, 2020 (KR) ........................ 10-2021-0119953

(51) Int. Cl.
*C09B 61/00* (2006.01)
*A23L 5/43* (2016.01)
*A23L 13/40* (2023.01)

(52) U.S. Cl.
CPC ................ *C09B 61/00* (2013.01); *A23L 5/43* (2016.08); *A23L 13/428* (2016.08)

(58) Field of Classification Search
CPC ........... C09B 61/00; A23L 5/43; A23L 13/428
(Continued)

(56) References Cited

U.S. PATENT DOCUMENTS 3,911,146 A     10/1975  Hara et al.
6,217,925 B1 *   4/2001  Kim ...................... A23B 2/733
                                                                426/654
(Continued)

FOREIGN PATENT DOCUMENTS

KR      10-2011-0105426  A       9/2011
KR      10-2015-0043585  A       4/2015
(Continued)

OTHER PUBLICATIONS

Extended European Search Report issued Sep. 20, 2024 for corresponding Australian Patent Application No. 21901073.3.
(Continued)

*Primary Examiner* — Brent T O'Hern
(74) *Attorney, Agent, or Firm* — Morgan, Lewis & Bockius LLP

(57) ABSTRACT

The present application relates to a natural coloring agent composition including a fermented plant product, wherein the composition includes nitrite in a concentration of 700 ppm or more and includes free sugar in a concentration of 1,000 ppm or less, and the free sugar includes lactose. The natural coloring agent composition may be prepared from natural raw materials to contain nitrite in a high concentration without inoculation of reducing bacteria, and may have an excellent color development effect when applied to meat products in place of synthetic nitrite.

11 Claims, 1 Drawing Sheet

(58) Field of Classification Search
USPC .......................................................... 426/250
See application file for complete search history.

(56) References Cited

U.S. PATENT DOCUMENTS

| | | |
|---|---|---|
| 12,004,547 B2 | 6/2024 | Thorsen et al. |
| 2014/0242217 A1 | 8/2014 | Husgen et al. |
| 2021/0315239 A1 | 10/2021 | Thorsen et al. |

FOREIGN PATENT DOCUMENTS

| | | |
|---|---|---|
| KR | 10-2017-0097891 A | 8/2017 |
| KR | 10-2018-0031438 A | 3/2018 |
| KR | 10-1920792 B1 | 11/2018 |
| KR | 10-2020-0075232 A | 6/2020 |
| KR | 10-2020-0135597 A | 12/2020 |
| KR | 10-2302385 B1 | 9/2021 |
| WO | 2019/211458 A1 | 11/2019 |

OTHER PUBLICATIONS

Flores et al., "Chemistry, safety, and regulatory considerations in the use of nitrite and nitrate from natural origin in meat products—Invited review", Meat Science, vol. 171,2021, pp. 1-12 (12 pages), XP086272316.

Barber et al., "Spinach Nitrate Reductase," Plant Physiology, 93: 537-540 (1990).

Kim et al., "Study of optimization of natural nitrite source production from spinach," Korean Journal of Food Science and Technology, 49 (4): 459-461 (2017) (see English abstract).

International Search Report issued in corresponding International Patent Application No. PCT/KR2021/018241 dated Mar. 18, 2022.

* cited by examiner

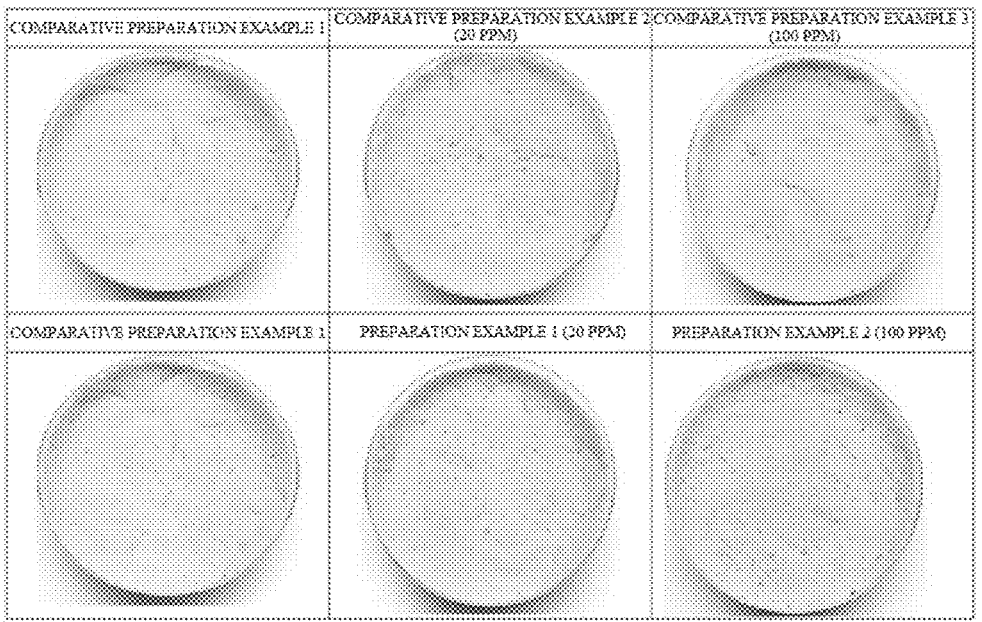

NATURAL COLORING AGENT COMPOSITION

BACKGROUND OF THE INVENTION

Field of Invention

The present application relates to a natural coloring agent composition.

Meat products such as ham and sausage processed using meat as a raw material are manufactured to have an inherent bright pinkish red or reddish color, and nitrite is added as a coloring agent to achieve color development of meat products. Nitrites allow meat products to exhibit a bright pinkish red color by reacting with myoglobin included in meat, and increase the shelf life of food products by inhibiting *C. botulinum* which produces toxin and preventing the growth of microorganisms.

However, in the case of synthetic nitrites commonly added as coloring agents, consumers are increasingly avoiding cured-meat products to which synthetic nitrites are added because synthetic nitrites are chemical synthetic additives, and accordingly, attempts have been made to produce and utilize nitrites from natural raw materials. As a method of producing natural nitrites, a method of obtaining nitrites by inoculating nitrate-rich plants or extracts thereof with reducing bacteria that have the ability to reduce nitrates to nitrites has been proposed.

KR 2018-0031438 discloses a method of producing natural nitrites by inoculating spinach extracts with *Lactobacillus farciminis* and performing fermentation, and "Study of optimization of natural nitrite source production from spinach" (KIM, Tae-Kyung et al. Korean J. Food Sci. Technol. vol. 49, no. 4, pp. 459-461(2017)) also discloses a method of inoculating *Staphylococcus carnosus* or various strains of *Lactobacillus* to produce natural nitrites by using spinach extracts. Inoculation of reducing bacteria is essentially used to produce natural nitrites. However, currently, there is a problem in that a process for producing natural plant extracts that satisfy a sufficient amount of nitrites, or a reduction technology is not secured in South Korea.

Therefore, in the present application, a natural coloring agent composition that contains a large amount of natural nitrites, and thus contains a smaller amount of nitrites than conventional natural coloring agent compositions and simultaneously has not only a sufficient color development effect but also suitable characteristics when added to meat products and then processed has been devised.

BRIEF SUMMARY OF THE INVENTION

An object of the present application is to provide a natural coloring agent composition containing a high concentration of nitrite which is treated such that a meat product may exhibit its inherent meat color.

In addition, an object of the present application is to provide a composition for manufacturing a meat product.

In addition, an object of the present application is to provide a meat product.

In addition, an object of the present application is to provide a method of developing a color of meat.

According to an aspect of the present application, there is provided a natural coloring agent composition including a fermented plant product, wherein the composition includes nitrite in a concentration of 700 ppm or more and includes free sugar in a concentration of 1,000 ppm or less, and the free sugar includes lactose.

According to another aspect of the present application, there is provided a composition for manufacturing a meat product, the composition including the natural coloring agent composition, wherein the natural coloring agent composition is included in an amount of 0.5 wt % or less.

According to another aspect of the present application, there is provided a meat product including the natural coloring agent composition and meat, wherein the meat product includes residual nitrite ion ($NO_2^-$) of 70 ppm or less.

According to another aspect of the present application, there is provided a method of developing a color of meat, the method including mixing the natural coloring agent composition with a meat raw material.

A natural coloring agent composition of the present application includes a fermented plant product, includes nitrite in a concentration of 700 ppm or more, and includes free sugar in a concentration of 1,000 ppm or less.

The nitrite is a combination of a nitrite ion ($NO_2$) and a salt, and may be specifically sodium nitrite ($NaNO_2$).

As the natural coloring agent composition includes nitrite, the natural coloring agent composition may be applied to food products, for example, meat-containing food products, and utilized for the purpose of allowing meat products to exhibit their inherent bright pinkish red or reddish color.

The nitrite may be produced by nitrate reductase within the plant. Unlike the related art in which nitrite is produced by reducing bacteria by inoculating a nitrate-containing plant with external reducing bacteria, the nitrite included in the natural coloring agent composition of the present application may be produced without inoculation of reducing bacteria by activating nitrate reductase present in a nitrate-containing plant or an extract of the plant. Therefore, there is an advantage in that a process for separately culturing reducing bacteria or a process for purchasing them may be omitted, such that nitrite may be produced in a more economical and easy way. The natural coloring agent composition of the present application has an excellent color development effect when applied to meat products, and costs, facilities, labor, and the like required to produce the natural coloring agent composition may be reduced. In addition, since there is no need to go through a process for inoculating reducing bacteria, there are advantages in that there is no concern about problems such as generation of unintended substances that may be caused by reducing bacteria, and there is no need for a process to remove reducing bacteria or by-products produced therefrom.

The natural coloring agent composition of the present application includes the nitrite in a concentration of 700 ppm or more. Specifically, the nitrite may be included in a concentration of 700 ppm or more, 750 ppm or more, 800 ppm or more, 1,000 ppm or more, 2,000 ppm or more, 2,500 ppm or more, 3,000 ppm or more, 5,000 ppm or more, 8,000 ppm or more, 10,000 ppm or more, 20,000 ppm or more, 30,000 ppm or more, 40,000 ppm or more, 50,000 ppm or more, 60,000 ppm or more, 70,000 ppm or more, 80,000 ppm or more, 90,000 ppm or more, 100,000 ppm or more, 110,000 ppm or more, 120,000 ppm or more, 130,000 ppm or more, 150,000 ppm or more, 180,000 ppm or more, or 200,000 ppm or more.

As the nitrite is included in a concentration in the above range in the natural coloring agent composition, the composition of the present application may allow the meat products to exhibit their inherent reddish color when applied to meat products, and may exhibit a color development effect at a level similar to that exhibited when synthetic nitrite is used, and even when a small amount is used, the natural coloring agent composition of the present invention may exhibit a color development effect at a level superior or similar to that exhibited when natural nitrite using reducing bacteria is used.

The natural coloring agent composition of the present application includes the free sugar in a concentration of 1,000 ppm or less, and the free sugar includes lactose.

Specifically, the free sugar may be included in a concentration of 1,000 ppm or less, 900 ppm or less, 800 ppm or less, 700 ppm or less, 500 ppm or less, 300 ppm or less, 200 ppm or less, 100 ppm or less, or 50 ppm or less. Among free sugars, reducing sugars may cause browning, after being applied to products, in a process of pasteurizing them at high temperatures, thereby negatively affecting the appearance of the products. As the natural coloring agent composition of the present application includes the free sugar in a concentration in the above range, when applied to meat products, the natural coloring agent composition may reduce browning even when exposed to high-temperature pasteurization conditions, which may be expected to result in a synergistic effect with respect to color and appearance improvement of products together with a color development effect attributed to nitrite.

More specifically, the natural coloring agent composition of the present application may include the fructose in a concentration of 1,000 ppm or less, or may not include glucose and sucrose.

The natural coloring agent composition of the present application may further include at least 8 amino acids selected from the group consisting of aspartic acid, glutamic acid, glycine, alanine, valine, methionine, isoleucine, leucine, tyrosine, phenylalanine, lysine, and arginine in a concentration of 500 ppm or more. Specifically, the natural coloring agent composition may include at least 8 amino acids, at least 9 amino acids, and at least 10 amino acids. In addition, specifically, the amino acids may be included in a concentration of 500 ppm or more, 600 ppm or more, 800 ppm or more, 1,000 ppm or more, 1,500 ppm or more, 2,000 ppm or more, 2,500 ppm or more, 3,000 ppm or more, 5,000 ppm or more, 7,000 ppm or more, 10,000 ppm or more, 12,000 ppm or more, 15,000 ppm or more, 17,000 ppm or more, 20,000 ppm or more, or 25,000 ppm or more. A nitrite-containing composition prepared by inoculating reducing bacteria may include amino acids in an amount less than the above range, and more specifically, may not include amino acids such as glycine, methionine, isoleucine, leucine, tyrosine, lysine, histidine, and arginine. As the composition of the present application includes various types of amino acids such as those described above in relatively high concentrations, positive effects may be exhibited in terms of nutrition and taste. For example, amino acids such as aspartic acid, glutamic acid, and glycine are known to have umami taste, and thus, when the composition of the present application is applied to meat products, advantageous effects may be exhibited in terms of flavor. In particular, the coloring agent composition of the present application may be applied to meat products and utilized for the purpose of inducing color development of the meat products, and considering objects to be applied are food products, the effects produced by the inclusion of amino acids such as those described above may exhibit a desirable synergistic effect together with a color development effect of the present application.

The natural coloring agent composition of the present application may further include at least one nucleic acid-based compound selected from the group consisting of hypoxanthine, guanosine, xanthine, inosine, xanthosine, and $IMP.2Na \cdot 7.5H_2O$. The natural coloring agent composition may not include adenine and/or $AMP.2Na$.

The natural coloring agent composition may further include acetic acid in a concentration of 1,000 ppm or more. Specifically, the acetic acid may be included in a concentration of 1,000 ppm or more, 2,000 ppm or more, 3,000 ppm or more, 5,000 ppm or more, 7,000 ppm or more, 10,000 ppm or more, 12,000 ppm or more, 20,000 ppm or more, 30,000 ppm or more, 40,000 ppm or more, or 45,000 ppm or more. In addition, the composition may include succinic acid. A nitrite-containing composition prepared by inoculating reducing bacteria may include 300 ppm or less of acetic acid or may include only a small amount of succinic acid, wherein acetic acid and succinic acid may improve the taste of food products, and thus, the natural coloring agent composition of the present application is more useful as a natural coloring agent composition than a natural coloring agent composition prepared by reducing bacteria.

The natural coloring agent composition may include γ-aminobutyric acid (GABA) in a concentration of 25 mg/L or more. Specifically, the GABA may be in a concentration of 25 mg/L or more, 50 mg/L or more, 100 mg/L or more, 200 mg/L or more, 500 mg/L or more, 900 mg/L or more, 1,000 mg/L or more, 1,500 mg/L or more, 1,700 mg/L or more, 2,000 mg/L or more, or 2,100 mg/L or more.

The natural coloring agent composition according to the present invention may be prepared by the following method.

The natural coloring agent composition may be prepared by preparing an extract from a nitrate-containing plant, activating nitrate reductase within the plant extract, and inactivating the nitrate reductase. The extraction is a process for releasing a component included in the plant to the outside, wherein the plant may be squeezed or crushed. The squeezing may include using conventional juicers, juicers for greens, or the like to obtain juice from plants. The crushing may include crushing or milling plants to obtain liquid within the plants and a plant body. The plant extract may include nitrate and nitrate reductase within the plant. When an extract is prepared through the extraction method as described above, there is an advantage in that the activity of nitrate reductase included in the extract may be maintained without loss or inhibition. For example, there is an effect of preventing inhibition of the activity of nitrate reductase, which may be caused by heat, a solvent, or an enzyme introduced from the outside. The activating of the nitrate reductase may include maintaining a pH range through a buffer system. Specifically, the maintaining of the pH range may include maintaining a pH within a range of pH 6 to pH 9, and specifically, within a range of pH 6.5 to pH 9, pH 6.5 to pH 8.5, pH 6.5 to pH 8, pH 6.5 to pH 7.5, or pH 6.5 to pH 7. In the case of going through a metabolic process, by-products thus produced may reduce the pH, thereby reducing the activity of the nitrate reductase. Therefore, in the case of maintaining the pH within the above range, the activity of the nitrate reductase may not be reduced, and a nitrite conversion rate may be maintained high.

The natural coloring agent composition of the present application may not include reducing bacteria that have nitrate-reducing activity. The reducing bacteria may be microorganisms of *Staphylococcus* genus, *Micrococcus* genus, *Lactobacillus* genus, *Enterococcus* genus, *Lactococcus* genus, *Streptococcus* genus, *Pediococcus* genus, or *Leuconostoc* genus, and more specifically, may be *Staphylococcus carnosus* or *Staphylococcus vitulinus*.

The fermented plant product may be obtained by proceeding a reaction of enzymes included in the plant or an extract thereof.

In the present application, the term "fermentation" refers to a series of metabolic processes in which organic compounds are changed by enzyme action.

The plant may be at least one selected from the group consisting of spinach, lettuce, Chinese cabbage, head lettuce, cabbage, young radish, sesame leaf, chicory, radish leaf, radish, crown daisy, kale, leaf mustard, leek, water parsley, and red beet, but is not limited thereto, and any plant that contains nitrate may be utilized.

The plant may include nitrate in a concentration of 3,000 ppm or more, for example, 3,100 ppm or more, 3,200 ppm or more, 3,300 ppm or more, 3,500 ppm or more, 4,000 ppm or more, 4,500 ppm or more, 5,000 ppm or more, 3,000 ppm to 10,000 ppm, 3,200 ppm to 8000 ppm, 3,500 ppm to 7,000 ppm, or 4,000 ppm to 6,000 ppm, but is not limited thereto, and the plant may be utilized as long as the plant includes nitrate in a concentration sufficient to allow a nitrite conversion reaction to occur.

The natural coloring agent composition of the present application may be in the form of powder, and in this case, may include nitrite in a concentration of 100,000 ppm or more. The powder may be prepared by freeze-drying or spray drying. When the composition of the present application is in the form of powder, the composition may include nitrite in a higher concentration and has an advantage of being easy to be applied to meat products. In addition, the composition in the form of powder has advantages in terms of storage and distribution processes.

A composition for manufacturing a meat product of the present application includes the natural coloring agent composition. The composition for manufacturing the meat product is for manufacturing meat products and may include pork, pork fat, and purified water, and its components and amount may vary depending on meat products. The natural coloring agent composition may be included in an amount of 5 wt % in the composition for manufacturing the meat product. Specifically, the natural coloring agent composition may be included in an amount of 4 wt % or less, 3 wt % or less, 2 wt % or less, 1 wt % or less, 0.5 wt % or less, 0.3 wt % or less, 0.2 wt % or less, 0.1 wt % or less, 0.08 wt % or less, 0.05 wt % or less, 0.03 wt % or less, or 0.01 wt % or less. The amount may vary depending on the amount of nitrite within a natural coloring agent, but since the natural coloring agent composition according to the present invention includes a high concentration of sodium nitrite, the amount of the natural coloring agent composition may be reduced, and as described above for the natural coloring agent composition, the natural coloring agent composition has an excellent color development effect when applied to meat products, allowing the meat products to exhibit their inherent bright pinkish red or reddish color. Accordingly, the natural coloring agent composition may be usefully utilized for manufacturing meat products by developing a color of meat.

A meat product of the present application may include the natural coloring agent composition and meat, and the meat product includes residual nitrite ion ($NO_2$) of 70 ppm or less.

As described above for the natural coloring agent composition, the natural coloring agent composition has an excellent color development effect when applied to meat products, allowing the meat products to exhibit their inherent bright pinkish red or reddish color. In addition, the natural coloring agent composition is prepared by using natural raw materials such as plants, and may be used as a substitute for synthetic nitrite. Therefore, the inclusion of the natural coloring agent composition in the meat product of the present application has an excellent effect in that meat may be allowed to exhibit a desired bright pinkish red or reddish color to have an appearance that satisfies preferences of consumers and stimulates their appetites.

The residual nitrite ion may be specifically in a concentration of 70 ppm or less, 65 ppm or less, 60 ppm or less, 55 ppm or less, 50 ppm or less, 40 ppm or less, 30 ppm or less, 20 ppm or less, 15 ppm or less, 10 ppm or less, 5 ppm or less, 2 ppm or less, or 1 ppm or less. Since nitrite ions may have the potential to have negative effect on health, when the amount of the residual nitrite ion is within the above range, there is an advantage in that a sufficient color development effect may be exhibited in meat products, and at the same time, adverse effects on health may be minimized.

A method of developing a color of meat of the present application includes mixing the natural coloring agent composition with a meat raw material.

As described above for the natural coloring agent composition, the natural coloring agent composition has an excellent color development effect when applied to meat products, allowing the meat products to exhibit their inherent bright pinkish red or reddish color. Therefore, meat may be colored to have a desired level of meat color by mixing the natural coloring agent composition with the meat raw material.

Advantageous Effects

A natural coloring agent composition of the present application may develop a color of meat by including plant-derived natural nitrite as a substitute for synthetic nitrite. The natural coloring agent composition may induce color development of meat products to a level similar to that of meat products in which synthetic nitrite is used, and attributed to a small amount of free sugars, may prevent browning caused by reducing sugar, thereby significantly improving the appearance quality of meat products. In addition, a large amount of amino acids included in the natural coloring agent composition of the present application may improve the taste quality of meat products, and considering that the coloring agent composition is applied to food products, an excellent synergistic effect may be expected.

However, the effects of the present application are not limited to the effects mentioned above, and other effects not mentioned will be clearly understood by those skilled in the art from the following description.

BRIEF DESCRIPTION OF THE SEVERAL
VIEWS OF THE DRAWINGS

FIGURE shows images captured by observing appearances of model meat products (Preparation Example 1 and Preparation Example 2) made by mixing meat with a coloring agent composition prepared by fermenting spinach without inoculation of reducing bacteria, model meat products (Comparative Preparation Examples 2 and 3) to which synthetic nitrite was added, and a model meat product (Comparative Preparation Example 1) to which nitrite was not added.

DETAILED DESCRIPTION OF THE INVENTION

Mode for Invention

Hereinafter, the present application will be described in detail by Examples.

However, the following Examples specifically illustrate the present application, and the description of the present application is not limited by the following Examples.

Example 1

In the present application, a novel natural nitrite-containing fermented solution including a large amount of natural nitrite by activating nitrate reductase contained in a plant was prepared.

Preparation of Fermented Spinach

Korean spinach (3,000 ppm or more of nitrate) was washed in running water to remove soil and foreign substances and then squeezed by using a conventional juicer for greens to thereby obtain a spinach extract.

The spinach extract was fermented at a temperature of 20° C. to 40° C. in a 2 L fermenter (Marado-PDA, BIOCNS Co., South Korea), the initial pH was set in a range of 8.5 to 9.0, a 0.03 M $Na_2CO_3$—$NaHCO_3$ buffer solution was used, the fermentation was performed under a condition of impeller 200 rpm, and a change in pH and changes in concentrations of nitrate and nitrite over time were measured (Table 1).

TABLE 1

| | Extract | 0 hour | 1 hour | 2 hours | 3 hours | 4 hours | 5 hours | 6 hours | 6.5 hours | 7 hours | 7.5 hours | 8 hours | 8.5 hours |
|---|---|---|---|---|---|---|---|---|---|---|---|---|---|
| pH | 6.09 | 8.99 | 8.77 | 8.65 | 8.04 | 7.34 | 7.19 | 7.02 | 6.83 | 6.74 | 6.70 | 6.60 | 6.54 |
| Nitrate (ppm) | 3.273 | 3.259 | 3.012 | 3.454 | 3.346 | 2.545 | 1.761 | 1.014 | 438 | 51 | 0 | 0 | 0 |
| Nitrite (ppm) | 0 | 0 | 0 | 0 | 297 | 933 | 1.556 | 2.082 | 2.602 | 2.874 | 2.948 | 2.897 | 2.899 |
| Conversion rate (%) | 0% | 0% | 0% | 0% | 9% | 29% | 48% | 64% | 79% | 88% | 90% | 89% | 89% |

As a result, it was confirmed that the pH gradually decreased as the reaction progressed, but a buffering effect attributed to the buffer solution was sufficiently shown, and the conversion rate increased to about 90% at about 7 hours into the reaction, indicating a significantly excellent conversion effect.

[1-2] Drying of Fermented Product

Preparation of Fermented Spinach Concentrate

An inactivation process was performed to remove the activity of the nitrate reductase in the fermented spinach prepared through the process of Example 1-1. After the fermented spinach was heated to a high temperature of 60° C. or more to inactivate the enzyme, 5% diatomaceous earth was added by using a filter press (JUNGDO 1000, JUNGDO Co., South Korea) and subjected to filtration using a 15 cc filter cloth for a first filtration, followed by a second filtration using a 5 μm MF filter to additionally remove residual diatomaceous earth and fine substances. Next, pasteurization was performed at a temperature of 95-100° C. for 1 minute and 30 seconds by using a UHT pasteurizer. Even after the inactivation, filtration, and pasteurization processes, nitrite losses were not significant. In addition, as concentration using a centrifugal thin-film concentrator was performed in a method with the least loss of nitrite, a concentrate of a nitrite-containing composition of the present application was prepared (Table 2).

TABLE 2

| | Nitrite (ppm) |
|---|---|
| Concentration concentration (27.5 Brix) | 34,728 |

Preparation of Fermented Spinach Powder

Powders of the spinach extract were prepared through spray-drying and freeze-drying methods by different spraying methods for the concentrate, and the concentrations of nitrite contained therein were measured and compared. In the case of spray drying, the solid content was adjusted to a level of 35-38 Brix by mixing maltodextrin with the concentrate. Ratios of the spinach concentrate to the maltodextrin were respectively set to 85:15, 88:12, and 90:10, followed by spray drying (in let temperature: 180° C., out let temperature: 90° C., sample injection speed: 10 mL/min). In the case of freeze-drying, the concentrate was pre-frozen in a deep freezer at −70° C. without adding an excipient thereto and then was subjected to using a freeze-dryer. As conditions for the freeze-drying, drying was performed for 72 hours with a vacuum degree of 20 kPa and with the temperature inside the chamber slowly raised from −40° C. to 30° C. The concentrations of nitrite included in the spray-dried powders (SD powders) in the above three ratios and the freeze-dried powder (FD powder) were measured and are shown in Table 3.

TABLE 3

| Composition | Nitrite (ppm) |
|---|---|
| SD powder (85:15) | 67,806 |
| SD powder (88:12) | 72,659 |
| SD powder (90:10) | 80,780 |
| FD powder (100) | 104,917 |

Example 2

Manufacture of Meat Products Using Nitrite-Containing Composition and Confirmation of Color Development

[2-1] Preparation of Model Meat Products

Using the fermented spinach powder prepared through Example 1, model meat products were manufactured by mixing pork hind leg meat with pork fat in proportions shown in Table 4. Preparation Examples 1 and 2 were prepared by adding the fermented spinach powder of Example 1 in concentrations of 20 ppm and 100 ppm, respectively, Comparative Preparation Example 1 was prepared without adding nitrite (negative control), and Comparative Preparation Examples 2 and 3 were prepared by adding synthetic nitrite in concentrations of 20 ppm and 100 ppm, respectively (positive controls). The fermented spinach powder was added to the meat products of Preparation Examples 1 and 2 in amounts of 0.03% and 0.49%, respectively, based on 100,000 ppm.

TABLE 4

| Raw material | Comparative Preparation Example 1 | Comparative Preparation Example 2 (20 ppm) | Comparative Preparation Example 3 (100 ppm) | Preparation Example 1 (20 ppm) | Preparation Example 2 (100 ppm) |
|---|---|---|---|---|---|
| Pork | 60.00 | 60.00 | 60.00 | 60.00 | 60.00 |
| Pork fat | 20.00 | 20.00 | 20.00 | 20.00 | 20.00 |
| Purified water | 16.70 | 16.70 | 16.70 | 16.60 | 16.50 |
| Soy protein isolate | 2.00 | 2.00 | 2.00 | 2.00 | 2.00 |
| Refined salt | 1.00 | 1.00 | 1.00 | 1.00 | 1.00 |
| Phosphate | 0.30 | 0.30 | 0.30 | 0.30 | 0.30 |
| Synthetic nitrite | | 0.002 | 0.01 | | |
| Fermented spinach powder | | | | 0.030 | 0.149 |
| Total | 100 | 100 | 100 | 100 | 100 |

[2-2] Measurement of Chromaticities of Nitrite-Added Meat Products

For the model meat products of Preparation Examples 1 and 2 and Comparative Preparation Examples 1 to 3, the appearances were observed and the chromaticities were measured. The meat products were pulverized with a blender and then put in a Petri dish, followed by performing measurement three times to measure Hunter L, a, and b values. For the surface color, a chromameter (CR-400, Minolta Co., Japan) calibrated with a standard white plate (L=97.40, a=−0.49, b=1.96) was used. Based on the measured L, a, and b values, color difference ($\Delta E$) values were calculated and analyzed for comparison (Table 5). *$\Delta E$ is the color difference from Comparative Preparation Example 1 (negative control), and **$\Delta E$ is the color difference from Comparative Preparation Example (positive control) of the same nitrite concentration.

TABLE 5

| Treatment group | L | a | b | *$\Delta E$ | **$\Delta E$ |
|---|---|---|---|---|---|
| Comparative Preparation Example 1 | 68.43 | 4.36 | 10.04 | | |
| Comparative Preparation Example 2 (20 ppm) | 67.46 | 6.36 | 8.49 | 2.71 | |
| Preparation Example 1 (20 ppm) | 67.85 | 7.69 | 8.26 | 3.81 | 1.40 |
| Comparative Preparation Example 3 (100 ppm) | 68.34 | 7.84 | 8.25 | 3.91 | |
| Preparation Example 2 (100 ppm) | 67.69 | 6.82 | 8.18 | 3.17 | 1.21 |

As a result of observing the appearances of the model meat products, the reddish color was barely observed in the negative control, Comparative Preparation Example 1, in which nitrite was not added, whereas the reddish color was observed in Preparation Examples 1 and 2 and Comparative Preparation Examples 2 and 3 even with naked eyes, compared to Comparative Preparation Example 1 (FIGURE). As a result of measuring the chromaticities, the difference in brightness between the meat products of Preparation Examples 1 and 2 and Comparative Preparation Examples was not large, and in the case of redness, except for Comparative Preparation Example 1 in which nitrite was not added, similar patterns were observed in Preparation Examples 1 and 2 and Comparative Preparation Examples 2 and 3. Even in the case of the color difference $\Delta E$ value, there was a big difference from the negative control, Comparative Preparation Example 1, whereas there was no significant difference in color difference values between the positive controls and Preparation Examples 1 and 2.

Based on the above results, it was confirmed that although the fermented spinach powder prepared without using reducing bacteria was added to the meat products, the meat products had a color development effect at a level similar to that of meat products to which synthetic nitrite was added.

[2-3] Measurement of Residual Nitrite Ions

The amounts of residual nitrite ions in the model meat products of Preparation Examples 1 and 2 and Comparative Preparation Examples 1 to 3 were measured by using the diazotization method. 0.5 N sodium hydroxide, 12% zinc sulfate, pH 9.0 ammonium acetate, and distilled water were added to 10 g of each sample, followed by homogenization, heating, and filtration processes to prepare a test solution. A sulfanilamide solution, a N-(1-nphthyl)ethylenediamine solution, and distilled water were added to the prepared test solution and reacted for 20 minutes. A spectrophotometer was used to measure, at a wavelength of 540 nm, the absorbance which was then substituted into a calibration curve to calculate the amount (μg) of nitrite ion included in 20 mL of the test solution. Based on this, the concentrations of nitrite ions were calculated and are shown in Table 6. It is expected that the fermented spinach powder may be used in a minimum amount such that a color development effect may be sufficiently exhibited, and at the same time, residual nitrite may be minimized.

TABLE 6

| | Comparative Preparation Example 1 | Comparative Preparation Example 2 (20 ppm) | Comparative Preparation Example 3 (100 ppm) | Preparation Example 1 (20 ppm) | Preparation Example 2 (100 ppm) |
|---|---|---|---|---|---|
| Nitrite ion (ppm) | 0 | 4.0 | 35.0 | 8.0 | 27.0 |

Example 3

Analysis of Components in Nitrite-Containing Composition According to the Present Application It was confirmed whether any component other than nitrite was included in the fermented spinach prepared through Example 1. A sample (hereinafter, "fermented spinach") prepared by squeezing spinach and performing fermentation through pH control in Example 1-1, a sample (hereinafter, "fermented spinach concentrate") subjected to inactivation and concentration processes as in Example 1-2, and a powder sample (hereinafter, "fermented spinach powder") prepared through a freeze-drying process as in Example 1-2 were used, and a fermented plant (hereinafter, "fermented reducing bacteria" or "fermented product prepared by inoculating reducing bacteria") prepared by a technique of the related art by inoculating nitrite reducing bacteria was used as a control. The conventional fermented plant was prepared by mixing dried celery powder with purified water and then inoculating reducing bacteria (*Staphylococcus camosus*) to perform fermentation.

[3-1] Analysis of Amino Acids

The types and amounts of amino acids contained in the fermented spinach, fermented spinach concentrate, and fermented spinach powder of the present application and the fermented reducing bacteria prepared through the technique of the related art were measured (Table 7).

Specifically, 9.9 mL of distilled water was added to 0.1 mL of each sample solution, thoroughly mixed, and then centrifuged (10,000 rpm, 10 minutes, 4° C.), and the supernatant was filtered through a 0.25 μm syringe filter. Amino acids of the filtrate were analyzed using an amino acid analyzer (high-speed amino acid analyzer, L-8900, Hitachi Co., Japan) under the following analysis conditions. A column used was 2622SC-PH ion exchange column (4.6×60 mm, Hitachi, Co., Japan). The mobile phase was in a gradient mode, and pump 1 pumped sodium acetate buffers (MCI buffer PH1, PH4, RG) at a column temperature of 57° C. and a flow rate of 0.4 mL/min, and pump 2 pumped ninhydrin solutions (R1, R2) at a flow rate of 0.35 mL/min. The injection volume was 10 μL, and a detector used was a dual-channel detector with channel 1: UV-570 nm and channel 2: UV-440 nm.

TABLE 7

| (ppm) | Fermented spinach | Fermented spinach concentrate | Fermented spinach powder | Fermented reducing bacteria |
|---|---|---|---|---|
| Aspartic acid | 27.03 | 68.85 | 402.99 | 31.70 |
| Threonine | 38.17 | ND | ND | 47.54 |
| Serine | 39.52 | Trace | 393.96 | 75.88 |
| Glutamic acid | 179.20 | 893.71 | 3,893.06 | 145.56 |
| Glycine | 30.93 | 159.99 | 492.11 | ND |
| Cysteine | ND | ND | ND | ND |
| Alanine | 62.52 | 535.07 | 1,693.99 | 18.85 |
| Valine | 109.11 | 891.48 | 2,710.17 | 32.81 |

TABLE 7-continued

| (ppm) | Fermented spinach | Fermented spinach concentrate | Fermented spinach powder | Fermented reducing bacteria |
|---|---|---|---|---|
| Methionine | 28.99 | Trace | 374.73 | ND |
| Isoleucine | 47.83 | 593.67 | 1,322.64 | ND |
| Leucine | 100.64 | 1,243.50 | 2,487.55 | ND |
| Tyrosine | 50.69 | Trace | 1,366.18 | ND |
| Phenylalanine | 134.44 | 2,362.49 | 3,318.69 | 74.82 |
| Lysine | 59.82 | 370.57 | 1,077.16 | ND |
| Histidine | ND | ND | ND | ND |
| Arginine | 12.73 | ND | ND | ND |

As a result, it was found that a total of 14 amino acids were produced and included in the samples such as the fermented spinach prepared in Example 1 of the present application, and some amino acids among them were modified during the concentration and drying processes or converted to other types of compounds during the metabolic process, resulting in some differences in the fermented spinach concentrate and the fermented spinach powder. Threonine was present in the control, fermented reducing bacteria, prepared with the technique of the related art by inoculating reducing bacteria, whereas threonine was not present in the samples such as the fermented spinach prepared through Example 1. In addition, glycine, methionine, isoleucine, leucine, tyrosine, lysine, and arginine were not detected in the fermented reducing bacteria, whereas all of the amino acids were detected in the fermented spinach of the present application, and all amino acids except for arginine were also detected in the fermented spinach concentrate and the fermented spinach powder. It was confirmed that the samples such as the fermented spinach included a large amount of amino acids such as aspartic acid and glutamic acid in addition to glycine, wherein glycine, aspartic acid, and glutamic acid are known as amino acids for umami, and thus, the nitrite-containing composition of the present application including such amino acids, when applied to meat or the like, may have positive effects not only in terms of color development but also in terms of taste.

[3-2] Analysis of Nucleic Acid-Based Compounds

The types and amounts of nucleic acid-based compounds contained in the fermented spinach, fermented spinach concentrate, and fermented spinach powder of the present application and the fermented reducing bacteria prepared through the technique of the related art were measured (Table 8).

Specifically, 200 μL of each sample solution in the filtered liquid state was obtained through centrifugation and injected into high-speed liquid chromatography (HPLC) device (HPLC, Waters, Milford, MA, U.S.A./Pump:Waters 510, Injector: Waters 712 WISP) to analyze the nucleic acid-based compounds. A UV detector (254 nm, Waters, Milford, MA, U.S.A.) and μ-Bondapack column (3.9×300 mm) were used, and the analysis temperature of the column was 30° C. A 1% triethylamine solution adjusted to pH 6.5 using phosphoric acid was used as a mobile phase solution, and the speed was 1 mL/min.

TABLE 8

| (ppm) | Adenine | Hypoxanthine | AMP.2 Na | Guanosine | Xanthine | Inosine | Xanthosine | IMP.2 Na•7.5H$_2$O |
|---|---|---|---|---|---|---|---|---|
| Fermented spinach | ND | Trace | ND | Trace | 35.54 | 0.47 | 0.53 | 7.67 |
| Fermented spinach concentrate | ND | 377.0 | ND | 45.0 | 577.0 | 115.0 | ND | ND |

TABLE 8-continued

| (ppm) | Adenine | Hypoxanthine | AMP.2 Na | Guanosine | Xanthine | Inosine | Xanthosine | IMP.2 Na•7.5H$_2$O |
|---|---|---|---|---|---|---|---|---|
| Fermented spinach powder | ND | 984.0 | ND | 85.0 | 1,387.0 | 176.0 | ND | ND |
| Fermented reducing bacteria | 2.26 | ND | 11.8 | ND | ND | ND | ND | ND |

As a result, adenine and AMP.2Na were detected in the fermented reducing bacteria prepared by inoculating reducing bacteria, but not detected in the fermented spinach, the fermented spinach concentrate, or the fermented spinach powder. In addition, it was confirmed that nucleic acid-based compound such as hypoxanthine, guanosine, xanthine, inosine, xanthosine, and IMP.2Na·7.5H$_2$O, which were not detected in the fermented reducing bacteria, were produced and present in the fermented spinach, the fermented spinach concentrate, or the fermented spinach powder. It was confirmed that some compounds were included only in the fermented spinach and were removed during the concentration and drying processes, but hypoxanthine, guanosine, xanthine, and inosine increased in concentration.

[3-3] Analysis of Organic Acids

The types and amounts of organic acids contained in the fermented spinach, fermented spinach concentrate, and fermented spinach powder of the present application and the fermented reducing bacteria prepared through the technique of the related art were measured (Table 9).

Specifically, 9.9 mL of distilled water was added to 0.1 mL of each sample solution, thoroughly mixed, and then centrifuged (10,000 rpm, 10 minutes, 4° C.), and the supernatant was filtered through a 0.25 μm syringe filter. Thermo Scientific Dionex ICS-3000 system was used to measure the types and amounts of organic acids contained in each sample solution, and the analysis was performed under the following conditions. A column used was aminex HPX-87H ion exclusion column (7.8×300 mm; Bio-Rad, Hercules, CA, U.S.A.). The mobile phase was in a gradient mode, and a solution of 0.005N sulfuric acid and acetonitrile (95:5, v/v) was flowed at a flow rate of 0.6 mL/min at a temperature of 33° C. and injected in an amount of 25 μL. A detector used was a Conductivity Detector.

TABLE 9

| | Citric acid | Malic acid | Succinic acid | Lactic acid | Acetic acid |
|---|---|---|---|---|---|
| Fermented spinach | ND | ND | 125.7 | ND | 1,027.1 |
| Fermented spinach concentrate | Trace | Trace | 723.1 | Trace | 12,402.9 |
| Fermented spinach powder | 2,360.4 | 1,966.9 | 5,349.2 | 1,203.4 | 45,393.7 |
| Fermented reducing bacteria | 87.0 | 1,274.2 | 29.2 | 149.3 | 243.7 |

As a result, adenine and AMP.2Na were detected in the fermented reducing bacteria prepared by inoculating reducing bacteria, but not detected in the fermented spinach, the fermented spinach concentrate, or the fermented spinach powder. In addition, it was confirmed that nucleic acid-based compounds such as hypoxanthine, guanosine, xanthine, inosine, xanthosine, and IMP.2Na·7.5H$_2$O, which were not detected in the fermented reducing bacteria, were produced and present in the fermented spinach, the fermented spinach concentrate, or the fermented spinach powder. It was confirmed that some compounds were included only in the fermented spinach and were removed during the concentration and drying processes, but hypoxanthine, guanosine, xanthine, and inosine increased in concentration.

[3-4] Analysis of Free Sugars

The types and amounts of free sugars contained in the fermented spinach, fermented spinach concentrate, and fermented spinach powder of the present application and the fermented reducing bacteria prepared through the technique of the related art were measured (Table 10).

Specifically, 9.9 mL of distilled water was added to 0.1 mL of each sample solution, thoroughly mixed, and then centrifuged (10,000 rpm, 10 minutes, 4° C.), and the supernatant was filtered through a 0.25 μm syringe filter. Dionex ICS-5000 system was used to measure the types and amounts of free sugars contained in each sample solution, and the following analysis was performed. Columns used were CarboPac PA1 guard column (Dionex, 50×4 mm) and CarboPac PA1 analytical column (Dionex, 250×4 mm) maintained at 30° C. A mobile phase A solution used was 400 mM NaOH, and a mobile phase B solution used was pure water. In a gradient mode, 0 min, 95% B, 5 min, 0% B, 30 min, 10% B, 30.1 min, 95% B, and 40 min, 95% B were flowed at a flow rate of 1.0 mL/min and injected in an amount of 5 μL. A detector used was ECD.

TABLE 10

| | Trehalose | Fructose | Glucose | Sucrose | Lactose |
|---|---|---|---|---|---|
| Fermented spinach | 12.45 | 27.63 | ND | ND | Trace |
| Fermented spinach concentrate | ND | ND | ND | ND | 230.5 |
| Fermented spinach powder | ND | ND | ND | ND | 793.6 |
| Fermented reducing bacteria | ND | 1,370.9 | 1,868.9 | 2,756.4 | ND |

As a result, trehalose and lactose, which were not detected in the fermented reducing bacteria, were present in the fermented spinach, and in particular, lactose was included even in the fermented spinach concentrate and the fermented spinach powder, which had been subjected to the filtration and drying processes. In addition, as a result of the fermentation using the reducing bacteria, glucose and sucrose were present in extremely large amounts, but were not detected at all in the fermented spinach.

The fermented product prepared by inoculating reducing bacteria contains a large amount of reducing sugars as described above, and thus, may cause browning and negatively affect the appearance when applied to products to be pasteurized at high temperatures. In contrast, the nitrite-containing composition of the present application has an excellent color development effect attributed to nitrite and has an effect of minimizing browning because a small amount of reducing sugars is included, and thus, when applied to meat products, may have an excellent synergistic effect in terms of improvement of the appearance quality.

[3-5] Analysis of γ-Aminobutyric Acids (GABA)

The amounts of γ-aminobutyric acids (GABA) contained in the fermented spinach, fermented spinach concentrate, and fermented spinach powder of the present application and the fermented reducing bacteria prepared through the technique of the related art were measured (Table 11).

Specifically, Water's AccQ Fluor™ reagent kit was used for derivatization for analysis. A reaction reagent was prepared by dissolving 1 mL of acetonitrile (vial 2B) in 6-aminoquinolyl-n-hydroxysuccinimidyl carbamate (vial 2A). 70 μL of a borate buffer solution (vial 1) was added to 10 μL of a standard solution and extract, vortexed, and then left at room temperature for 1 minute. After 20 μL of the reaction reagent was added and vortexed, the mixture was reacted in a water bath at 55° C. for 10 minutes. After completion of the reaction, the mixture was cooled to room temperature and analyzed using HPLC (Waters 2690 system). A column used was Mightysil RP-18 GP column (4.6×250 mm, 5 μm, Kanto Chemical, Tokyo, Japan), a mobile phase A was obtained by diluting 200 mL of AccQ-Tag Eluent A concentrate in 2 L of HPLC water, and a mobile phase B used was AccQ-Tag Eluent B. Solvent composition was analyzed by gradient elution with an initial A:B maintained at 90:10, followed by 70:30 (0.6 mL/min) by 30 minutes, 0:100 (0.8 mL/min) by 31 minutes, 0:100 (0.8 mL/min) by 38 minutes, 90:10 (0.6 mL/min) by 39 minutes, and 90:10 (0.6 mL/min) by 50 minutes. The sample injection amount was 10 L, and a detector used was a fluorescence detector (474, Waters) with Ex. 250 nm and Em. 395 nm for analysis.

TABLE 11

| | Fermented spinach | Fermented spinach concentrate | Fermented spinach powder | Fermented reducing bacteria |
|---|---|---|---|---|
| GABA (mg/L) | 54.0 | 940.0 | 2,150.0 | 10.0 |

As a result, it was confirmed that the fermented spinach contained at least 5 times higher concentration of GABA than the fermented product prepared using reducing bacteria, and the fermented spinach concentrate and the fermented spinach powder contained even larger amounts of GABA.

In the above, although representative embodiments of the present application have been exemplarily described, the scope of the present application is not limited to specific embodiments as described above, and those skilled in the art will be able to make appropriate changes within the scope described in the claims of the present application.

The invention claimed is:

1. A natural coloring agent composition comprising a fermented product of a plant or a part thereof, wherein the composition comprises glycine, nitrite in a concentration of 700 ppm or more, and free sugar in a concentration of 1,000 ppm or less, wherein the free sugar comprises lactose.

2. The natural coloring agent composition of claim 1, wherein the plant or the part thereof is at least one selected from the group consisting of spinach, lettuce, Chinese cabbage, head lettuce, cabbage, young radish, sesame leaf, chicory, radish leaf, radish, crown daisy, kale, leaf mustard, leek, water parsley, and red beet.

3. The natural coloring agent composition of claim 2, wherein the plant or the part thereof comprises nitrate in a concentration of 3,000 ppm or more.

4. The natural coloring agent composition of claim 1, wherein the nitrite is produced by nitrate reductase in the plant or the part thereof.

5. The natural coloring agent composition of claim 1, wherein the composition further comprises at least 7 amino acids selected from the group consisting of aspartic acid, glutamic acid, alanine, valine, methionine, isoleucine, leucine, tyrosine, phenylalanine, lysine, and arginine in a concentration of 500 ppm or more.

6. The natural coloring agent composition of claim 1, wherein the composition further comprises at least one nucleic acid-based compound selected from the group consisting of hypoxanthine, guanosine, xanthine, inosine, xanthosine, and IMR2na 7.5H$_2$O.

7. The natural coloring agent composition of claim 1, wherein the composition further comprises ascetic acid in a concentration of 1,000 ppm or more.

8. The natural coloring agent composition of claim 1, wherein the composition comprises γ-aminobutyric acid (GABA) in a concentration of 25 mg/L or more.

9. The natural coloring agent composition of claim 1, wherein the composition does not comprise reducing bacteria that have nitrate-reducing activity.

10. The natural coloring agent composition of claim 1, wherein the nitrite is included in a concentration of 5,000 ppm or more.

11. The natural coloring agent composition of claim 1, wherein the natural coloring agent composition is in a powder form and comprises nitrite in a concentration of 100,000 ppm or more.

* * * * *